April 14, 1970     D. E. WESTLING     3,505,963
METHOD FOR DISPENSING SAUSAGE AND THE LIKE ONTO PIZZA
Original Filed April 4, 1966     2 Sheets-Sheet 1
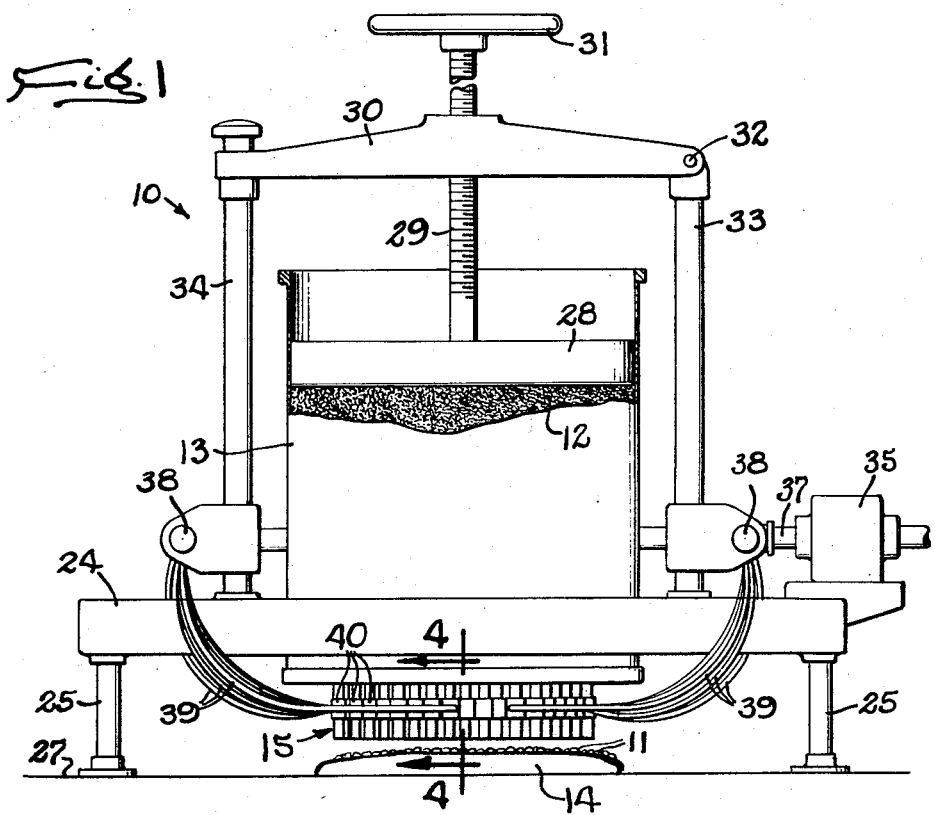
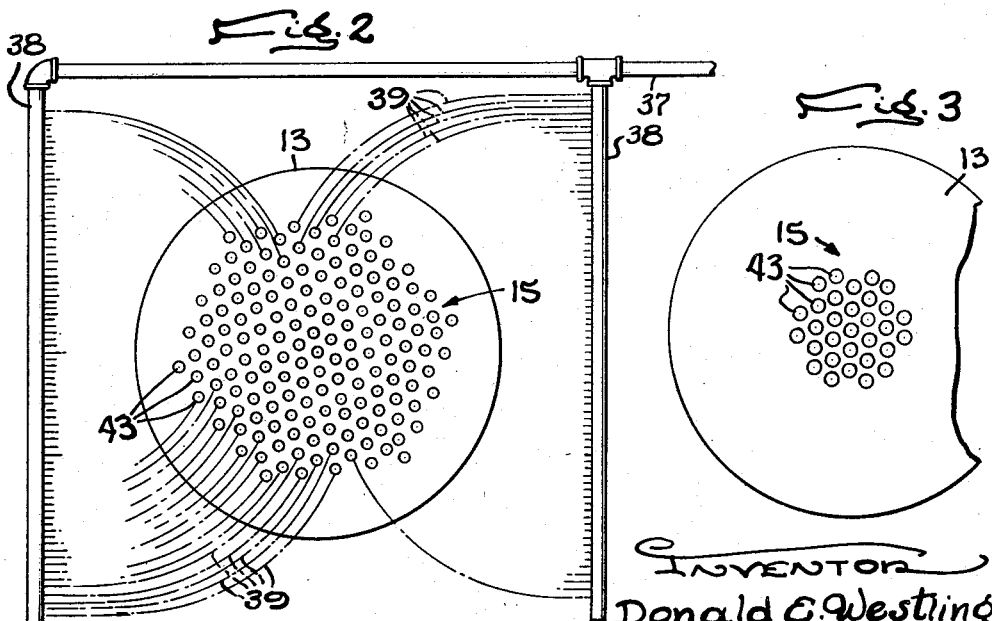
INVENTOR
Donald E. Westling
by Wolfe, Hubbard, Voit & Osann
ATTORNEY

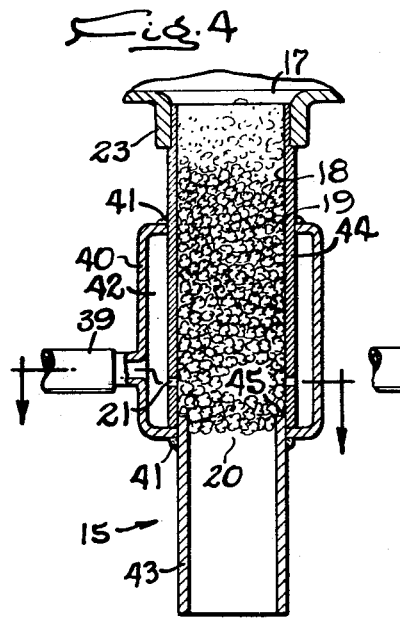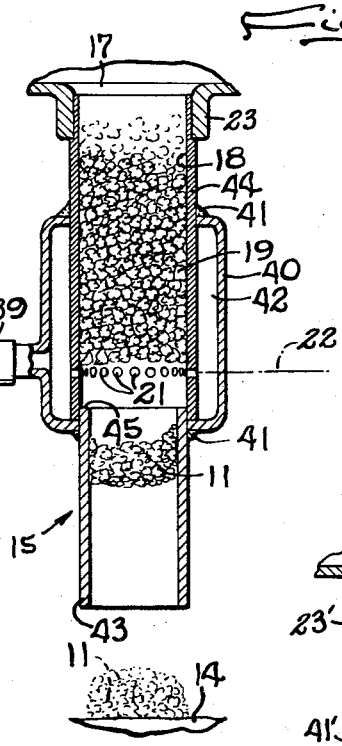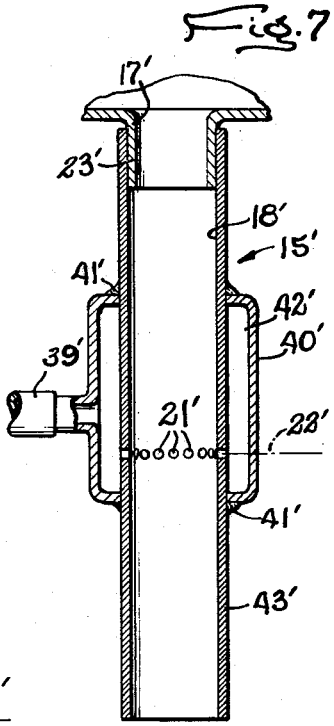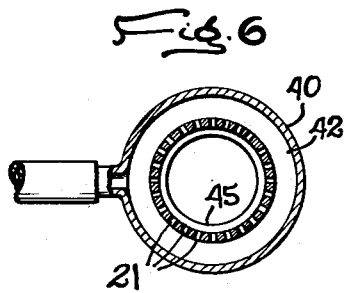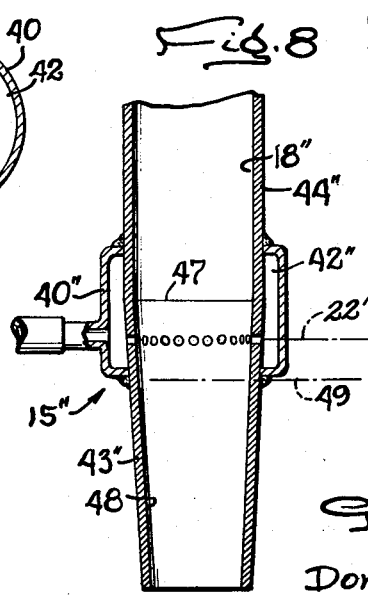

3,505,963
METHOD FOR DISPENSING SAUSAGE AND THE LIKE ONTO PIZZA

Donald E. Westling, 2432 Iva Court, Beloit, Wis. 53511
Original application Apr. 4, 1966, Ser. No. 539,967, now Patent No. 3,403,712. Divided and this application Mar. 4, 1968, Ser. No. 710,267
Int. Cl. B26f *3/00;* A23p *1/00*
U.S. Cl. 107—54      1 Claim

ABSTRACT OF THE DISCLOSURE

The method of dispensing sausage and the like onto pizzas from a mass supply held in a tub, the sausage being forced into discharge tubes through openings in the bottom of the tub to form a plurality of columns of sausage. Around each tube at a preselected cut-off level is a manifold to which air under pressure is directed into the sausage from several directions above the lower end of the column to sever the end portions and expel them through the lower ends of the tubes toward a pizza. The lower ends of the columns are positioned by restrictions in the tubes in two forms of the machine, while a third form relies only on control of the feeding of the mass supply to position the lower ends. The tubes are arranged in a preselected pattern above the pizza to dispense sausage in the same pattern, having barrels for guiding the severed portions of sausage toward the pizza.

CROSS-REFERENCE TO RELATED APPLICATION

This is a division of my copending application Ser. No. 539,967, filed Apr. 4, 1966, and now Patent No. 3,403,712.

BACKGROUND OF THE INVENTION

This invention relates to the dispensing of flowable semi-solid or pasty material and, more particularly, to the dispensing of sausage and the like from a supply mass onto pizzas. In the "raw" form, sausage is very difficult to handle, and the placing of a large number of pieces of sausage on pizzas prior to baking the latter is a time-consuming and messy operation, and is a particular problem in the mass-production of pizza.

SUMMARY OF THE INVENTION

The general object of the present invention is to provide a commercially practical method for dispensing difficult-to-handle pasty materials quickly and easily in large quantities but in relatively small and uniformly distributed pieces and thereby simplifying the volume production of pizza with sausage. A more detailed object is to form pasty material such as sausage from the supply mass into a plurality of columns in discharge passages having outlets arranged over the discharge area, and to sever the terminal portions of the sausage columns rapidly in an effective and simple manner for discharge onto the area. Another object is to expel the severed portions onto pizza automatically as an incident to the severing operation. A further object is to limit the forced feeding of the sausage along the passages and hold the lower portions releasably in place prior to severance and expulsion. The invention also resides in the novel manner of severing pasty material and expelling the same with fluid jets.

Other objects and advantages of the invention will become apparent from the following detailed description taken in connection with the accompanying drawings.

BRIEF DESCRIPTION OF THE DRAWINGS

FIGURE 1 is a side elevational view of a sausage dispensing machine for practicing the present invention, shown with a pizza in position to receive sausage.

FIG. 2 is a schematic bottom view showing the arrangement of discharge elements and their air supply connections.

FIG. 3 is a view similar to part of FIG. 4 showing only the discharge elements used for smaller pizzas.

FIG. 4 is an enlarged fragmentary cross-section taken substantially along the line 4—4 of FIG. 1 and showing the condition of the sausage in a discharge element prior to severance.

FIG. 5 is a view similar to FIG. 4 but showing the condition after severance.

FIG. 6 is a fragmentary cross-section taken substantially along the line 6—6 of FIG. 4.

FIGS. 7 and 8 are views similar to FIG. 4 showing alternate forms of the discharge element.

In the drawings, the invention is illustrated in connection with a machine 10 for dispensing small pieces 11 of sausage from a supply mass 12 in a receptacle 13 onto a pizza 14 in a discharge area beneath the machine, the machine being formed in a novel manner to dispense successive groups of pieces quickly and easily onto successive pizzas in the discharge area in a preselected pattern. With such a machine, a relatively large number of pieces may be placed on each pizza in a few seconds in a preselected pattern, not only saving a substantial amount of time per pizza but also resulting in an improved product as compared to presently used commercial methods.

To the foregoing ends, sausage from the receptacle 13 is fed into a plurality of tubular discharge elements 15 secured to the underside of the cylinder 13 through feed openings 17 (FIGS. 4 and 5) in the receptacle communicating with the interior passages 18 defined by the discharge elements, and is fed downwardly through these passages to form columns 19 having lower ends 20 adjacent the open lower ends of the passages. At least one nozzle 21 is positioned at a cut-off level 22 above the level of the end of the column 19 in each passage, and opens laterally into the passage to direct a charge of fluid under pressure into and across the passage to sever the lower portion of the column beyond the nozzle, from the remainder of the column. At the same time, the pressure fluid expels the severed portion through the open lower end of the discharge element toward the discharge area. With this arrangement, difficult-to-handle sausage is divided quickly and easily into a selected number of small pieces of controlled size and automatically delivered to and positioned on the pizza, thus eliminating the tedious, messy and time-consuming manual operation that has been used in the past.

In this instance, the recepticle 13 is simply a cylindrical tub having an open upper end and a preselected number of holes 17 in its bottom provided with fittings 23 for receiving the upper ends of the tubular discharge elements 15 with a press fit. Of course, there are many different ways that this connection can be made. In FIG. 7, for example, the tubular element 15′ is telescoped tightly over the fitting 23′ on the bottom of the tub, and a threaded connection also may be used. The tub is supported on a horizontal framework 24 having legs 25 for engaging a work surface 27 such as a table or counter top.

To feed sausage 12 from the tub 13 through the openings 17 and into the discharge passages 18, a plunger 28 is fitted in the tub and selectively movable up and down therein by means of a screw 29 threaded through a horizontal crossbar 30 spaced above the top of the tub. The lower end of the screw is rotatably connected to the plunger, and a hand wheel 31 is fastened to the upper end of the screw to facilitate turning of the latter to force sausage from the tub into the discharge passages. The crossbar is pivoted at one end on a horizontal pin 32 adjacent the top of a post 33 upstanding from the framework 24 on the right side of the tub, and is releasably secured at its other end on top of a similar post 34 on the opposite side of the tub. Accordingly, when the plunger is at the top of the tub, it may be swung upwardly and to one side, about the axis defined by the pin 32, for easy refilling of the tub.

Each of the discharge elements 15 comprises a hollow tube preferably composed of metal, and the nozzles 21, of which there should be several, are holes punched through the tube in a circular series above the lower end of the tube. The level of these nozzles determines the cut-off level 22 of the discharge element. The preferred cut-off fluid is pressurized air from a suitable source (not shown) such as a pump, delivered to the nozzles of each element through a valve 35, pipes 37 and 38 (FIGS. 1 and 2), flexible hoses 39 leading to the elements, and manifolds 40 each in the form of a sleeve larger than and encircling the discharge tube at the level of the nozzles 21 and sealed as by welding to the tube at 41 above and below the nozzles. In this manner, the manifold sleeves define annular air chambers 42 around the tubes communicating between the supply hoses 39 and the nozzles 21.

In the form of the discharge element shown in FIGS. 4–6, a second tube 43 smaller than the upper discharge tube 44 is telescoped snugly into the lower end portion of the upper tube and fastened in place with its upper end 45 below the nozzles 21 and constituting an annular shoulder in the discharge passage forming a restriction therein below the cut-off lever 22. As illustrated in FIG. 4, this restriction serves as means for resisting feeding of the column 19 of sausage down the passage 18 and will hold the column in place in the absence of substantial feeding pressure from above. It will be seen in FIG. 4 that the spacing of the shoulder 45 below the cut-off level 22 determines the approximate spacing of the lower end 20 of the sausage column below the cut-off level, and thus sets the approximate thickness of the pieces 11 of sausage that are dispensed. I prefer a spacing on the order of ¼ inch, and an upper discharge tube with an inside diameter of about ½ inch.

Shown in FIGS. 7 and 8 are two alternate forms 15' and 15" of the discharge element made without the shoulder 45, similar parts in these forms being indicated with corresponding primed and double-primed reference numbers. In FIG. 8, the lower end portion 43" is tapered downwardly from a level 47 spaced above the cut-off level 22" to form a progressively narrowing restriction 48 for holding the end of the column of sausage simply by compressing it as it passes the cut-off level. I have found that the taper shown in FIG. 8 will stop the column at a preselected approximate level 49 somewhat below the cut-off level. In the form 15' in FIG. 7, there is no restriction in the discharge passage 18'. This form simply relies on the closing of the upper end of the passage by sausage in the tube to hold the column in place, using the feed pressure alone to control the feeding of sausage down the passage.

To begin operation of the machine, a supply 12 of sausage is placed in the tub 13 and the plunger 28 is lowered to press the sausage into the discharge passages 18. When the lower end of the sausage columns 19 reach the level shown in FIG. 4, the machine is ready for operation. With a pizza 14 positioned in the discharge area beneath the machine, a momentary blast of air of suitable relatively low pressure such as 4–6 p.s.i. is admitted through the valve 35 into the pipe 37 and produces a pulse of pressure through the pipes 38 and the hoses 39 to the pressure chamber 42 in each manifold 40. From the pressure chamber, the air issues into and across the associated discharge passage 18 in a plurality of jets which slice through the sausage column at the cut-off level 22 and separate the terminal portion 11 of each column from the remainder thereof, as shown in FIG. 5. The blast is maintained long enough to effect the severance and to blow the severed portion downwardly and out of the discharge passage onto the pizza below.

In each of the three forms, the tube 43 forming the lower end portion of the element extends a substantial distance, for example, about 2 inches, beyond the end 20 of the sausage column in order to guide the severed piece as it is expelled. Without this so-called "barrel" beyond the piece as it is severed, the direction of discharge would be erratic and uncontrolled.

A smaller discharge pattern with fewer nozzles is illustrated in FIG. 3. As is well known, pizza typically is sold in three diameters—10 inch, 14 inch and 16 inch. The pattern shown in FIG. 2 with approximately 150 elements is intended for use on 16-inch diameter pizzas. Of course, fewer elements may be provided, if desired, and smaller machines may be designed for smaller pizzas. To adapt the larger machine for different sizes of pizzas, all that is necessary is the provision of an air control (not shown) which supplies air selectively to a central group of elements within a 10-inch circle, to a larger group within a 14-inch circle, or to the full group within a 16-inch circle. With three control valves and a somewhat more complex piping arrangement, one machine will handle all three different sizes.

While the invention has been described in connection with the illustrative embodiments shown in the drawings, it will be understood that it is not limited thereto, and that my invention is to cover all modifications and alternatives of the method falling within the spirit and scope of the invention as expressed in the claim.

I claim as my invention:

1. The method of dispensing sausage onto a pizza from a mass supply located directly above the pizza, said method including the steps of, feeding the sausage from said mass supply along a straight vertical path and, while the sausage is being fed vertically, dividing the sausage into at least ten upright columns arranged generally circular fashion above a single pizza, stopping the flow of sausage in said columns when the lower ends of the latter are at a predetermined approximate level, severing the terminal portions from said columns with charges of fluid under pressure impinged against said columns, and expelling the severed portions of the columns onto the pizza in a group with said fluid.

References Cited

UNITED STATES PATENTS 3,177,846    4/1965    Archer et al. _____ 118—25

EDWARD L. ROBERTS, Primary Examiner

U.S. Cl. X.R.

83—177; 107—27; 118—25